April 12, 1927.
G. P. A. WEISENBORN
1,624,701
CHURN, MIXING MACHINE, AND BEATER
Filed Nov. 13, 1925  3 Sheets-Sheet 2
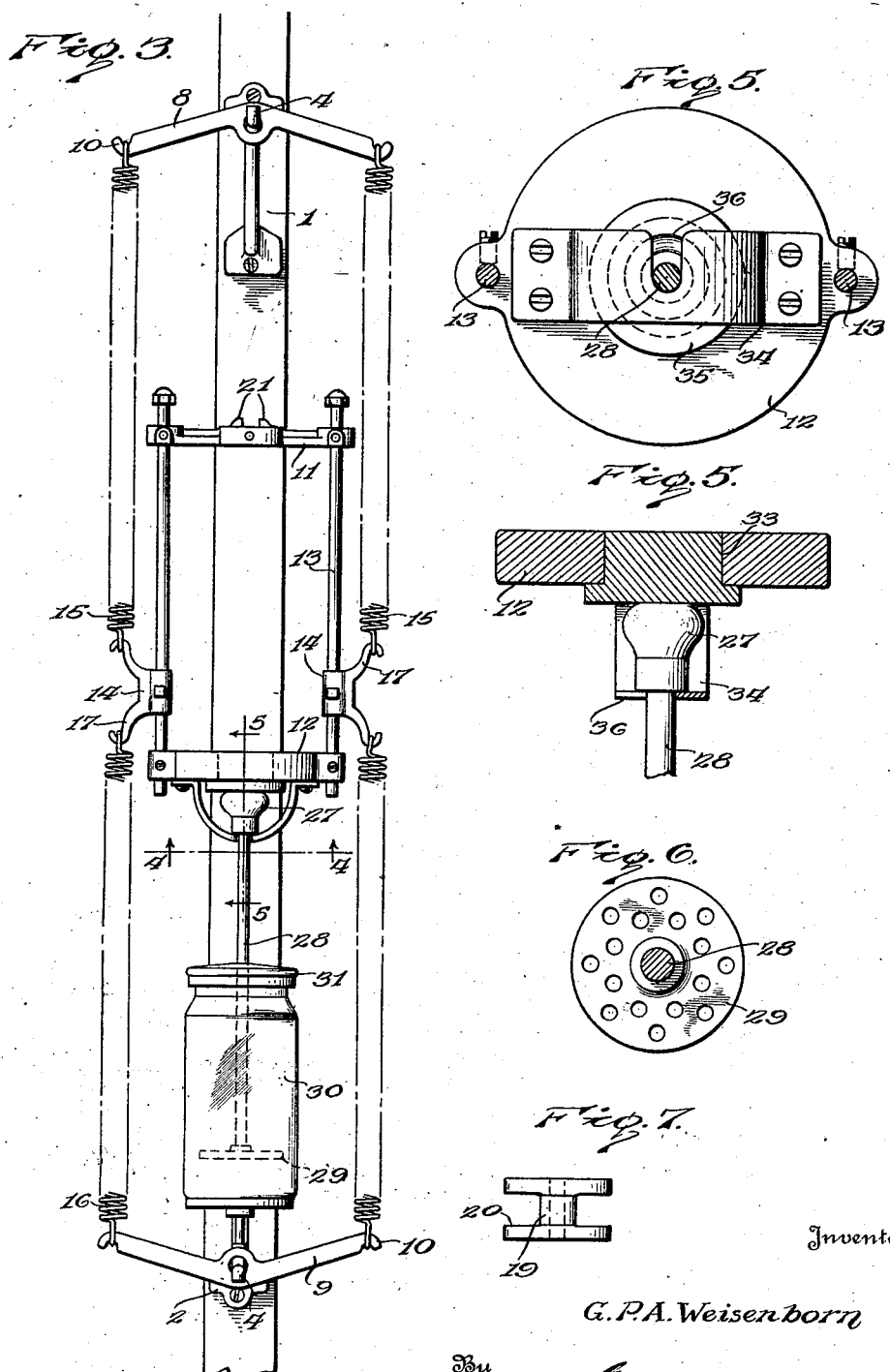
Inventor
G. P. A. Weisenborn
By
Attorneys April 12, 1927.
G. P. A. WEISENBORN
1,624,701
CHURN, MIXING MACHINE, AND BEATER
Filed Nov. 13, 1925      3 Sheets-Sheet 3
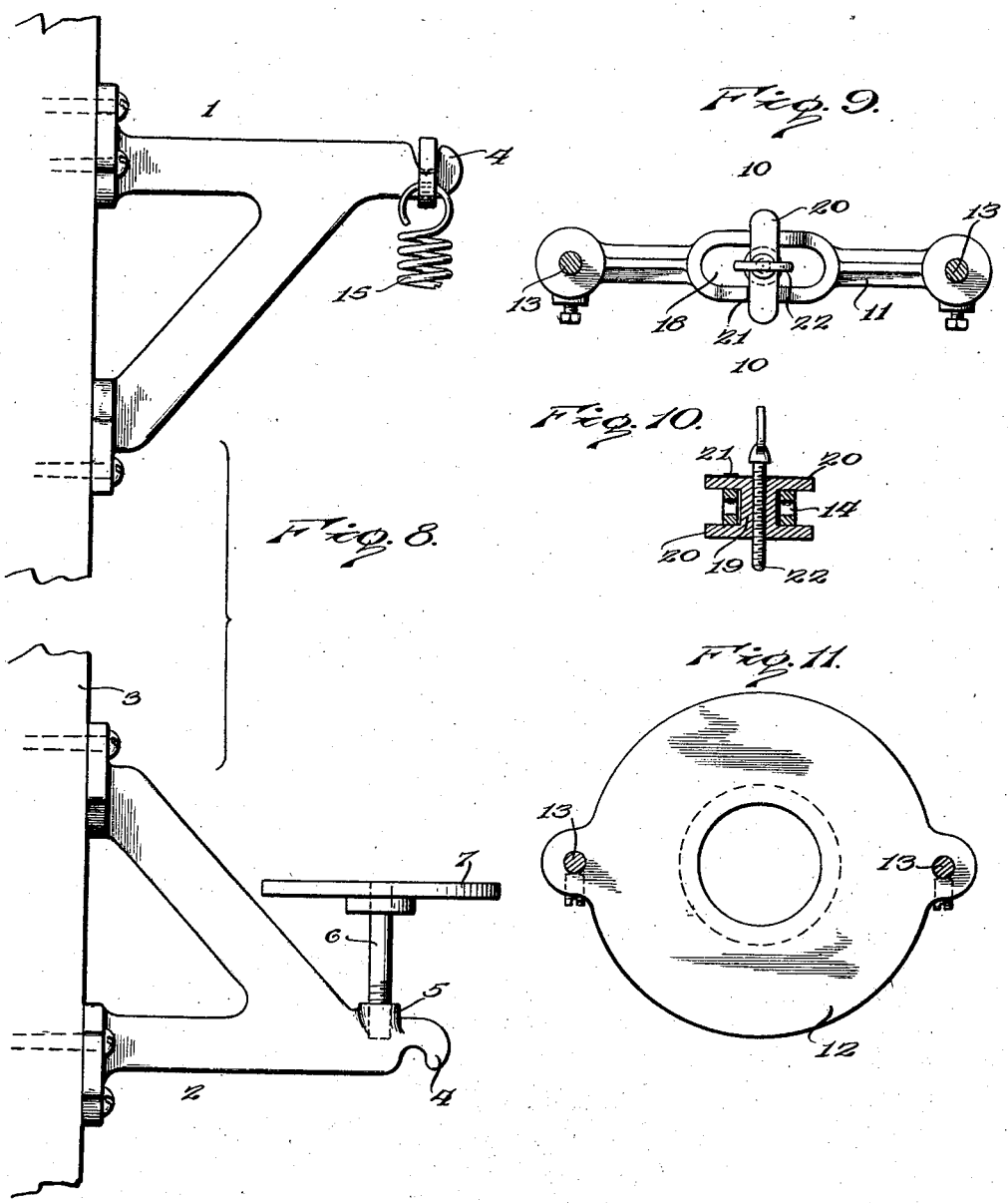

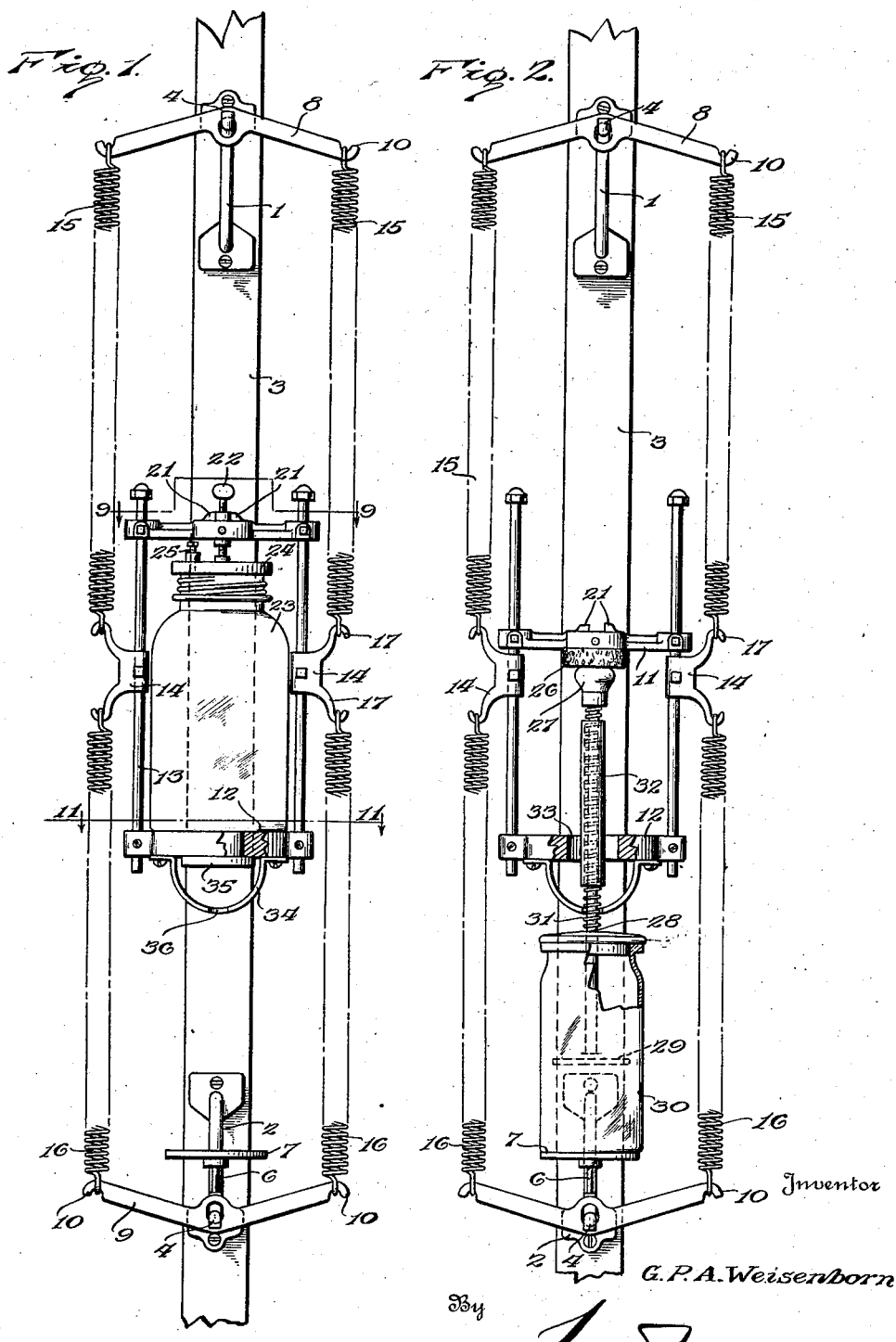

Patented Apr. 12, 1927.

1,624,701

UNITED STATES PATENT OFFICE.

GEORGE P. A. WEISENBORN, OF KANSAS CITY, MISSOURI.

CHURN, MIXING MACHINE, AND BEATER.

Application filed November 13, 1925. Serial No. 68,888.

This invention relates to a machine designed chiefly for household use and adapted to operate as a churn, a mixer, or a beater, the machine being readily attachable to or detachable from a support, so as to be easily and quickly placed in position for service, or dismounted to be stored when not required for immediate action.

The invention provides a machine of the nature aforesaid which is adjustable to adapt it for a variety of applications, as occasion may require, to agitate either a receptacle or a dasher as found most advantageous.

While the drawings illustrate a preferred embodiment of the invention, it is to be understood that in adapting the means to meet the specific needs and requirements, the design may be varied, and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a front view of a machine embodying the invention showing the same adapted for use as a churn or mixer, Figure 2 is a view similar to Figure 1 showing the machine adapted for use as a beater, Figure 3 is a view similar to Figure 2, the parts being differently adjusted and showing the dasher shaft clipped to the base of the carrier and stripped of the spring and protecting tube, Figure 4 is an enlarged detail sectional view on the line 4—4 of Figure 3 looking in the direction of the arrows, Figure 5 is a detail sectional view on the line 5—5 of Figure 4, Figure 6 is a detail view of the dasher as seen from the lower side, Figure 7 is a detail side view of the nut which is adapted to be detachably fitted to the cross bar of the carrier, Figure 8 is an enlarged side view of the brackets showing the rest applied to the lower bracket and the yoke to the upper bracket, a portion of the spring being illustrated in connection with the yoke, Figure 9 is an enlarged sectional view on the line 9—9 of Figure 1, Figure 10 is a detail sectional view on the line 10—10 of Figure 9, and Figure 11 is a sectional view on the line 11—11 of Figure 1 looking downwardly.

Corresponding and like parts are designated in the several views of the drawings and referred to in the following description by like reference characters.

The beater comprises a pair of brackets of similar or like construction which are inversely disposed and attached to a suitable support. The brackets are designated by the numerals 1 and 2 respectively and the support by the numeral 3. The brackets may be secured to the support by any suitable fastening means and are spaced apart in vertical relation a proper distance, and each terminates in a hook 4 which engages the opening of the yoke associated therewith. The lower bracket 2 is preferably formed with a boss 5 which is internally threaded to receive the stem 6 of a rest 7. The yokes 8 and 9 are of similar or like formation and are reversely disposed, so that the arms of the upper yoke 8 incline outwardly and downwardly whereas the arms of the lower yoke 9 incline outwardly and upwardly. Each of the yokes consists of a bar having a centrally disposed eye or opening to receive the hook 4 of the bracket with which it is associated, the arms upon opposite sides of the eye or opening being oppositely inclined and terminating in hooks 10 for engagement therewith of coil springs.

The carrier is yieldably supported between the yokes 8 and 9 so as to receive the jigging movement which is essential for churning, mixing or beating. This carrier comprises a cross bar 11, a base 12 and connecting rods 13 which adjustably connect the cross bar and base and upon which said parts 11 and 12 have independent adjustment.

A coupling 14 is adjustably mounted upon each of the connecting rods 13 and serves to connect upper and lower coil springs 15 and 16. Each of the couplings 14 consists of a body and oppositely disposed arms 17 terminating in hooks to engage eyes at the ends of the respective springs 15 and 16. The carrier as a whole may be adjusted vertically as indicated most clearly in Figures 1 and 3, or the parts 11 and 12 may be independently adjusted as required. The parts when adjusted may be secured by any suitable fastening means, and as indicated set screws are associated therewith to hold them in the required adjusted position. The cross bar 11 is provided intermediate its ends with an elongated opening 18 to receive a nut 19. The nut 19 is of a diameter corresponding to the width of the opening 18 and parallel cross heads 20 at the ends of the nut are spaced apart a distance to snugly receive the middle portion of the cross bar 11 in which is formed the opening 18. Lugs 21 project vertically from the parts of the cross bars 11 bordering upon the opening 18 and constitute stops to limit the movement of the nut 19 when the cross heads 20 assume a position at a right angle to the cross bars. The cross heads 20 while conforming to the elongated opening 18 are of a slightly less dimension so as to pass freely therethrough to admit of placing the nut in position or removing it from the cross bar as required. When the nut 19 is adjusted within the opening 18 with the cross heads 20 in line with said opening, it may be disengaged from the cross bar either by an upward or a downward movement, or by giving the nut a one-quarter turn to the right to bring the upper cross head in engagement with the stop lugs 21, the nut is centralized within the opening and is held in place by the projecting ends of the cross heads engaging the upper and lower sides of that portion of the cross bar 11 bordering upon the opening 18, as will be readily appreciated. A clamp screw 22 is associated with the nut 19 and operates to hold the part applied to the carrier.

When the device is adjusted for use as a churn or mixture it appears substantially as shown in Figure 1, a receptacle 23 is placed upon the base 12 and held thereon by the clamp screw 22 which engages the cover 24 provided for closing the receptacle 23 and which cover has an opening which is closed by means of a plug 25. The base 12 and the cross bars 11 are adjusted a distance apart to accommodate the receptacle 23 and its cover 24, said receptacle being supplied with the material to be churned or mixed which is effected by imparting a jigging motion to the carrier which is facilitated by the yieldable connection, comprising the springs 15 and 16. The carrier may be adjusted vertically in the manner stated.

When the device is designed to be used as a beater, the nut 19 is removed from the cross bar 11 and may be replaced by a pad 26 of soft rubber which is fitted into the opening 18 of the cross bar and which is adapted to engage the head 27 on a dasher shaft 28. The dasher 29 secured to the lower end of the shaft 28 may be of any preferred construction and as shown in Figure 6 consists of a perforated disc and is arranged to operate in a receptacle 30, which is placed upon the rest 7. The dasher shaft 28 operates through an opening in the cover 31' provided for closing the receptacle 30. In one application of the invention a coil spring 31 surrounds the upper portion of the dasher shaft 28 and is confined between the cover 31 and the head 27 and when the latter is depressed the spring 31 is compressed and upon the upward movement of the carrier the spring 31 regaining itself moves the dasher upwardly. A tube 32 encloses a portion of the coil spring 31 and prevents contact thereof with the base 12 in which is formed an opening 33 for the dasher shaft to pass through in order that the head 27 may engage the part 26 applied to the cross bar 11.

In another adaptation of the invention, when adjusted for use as a churn or beater, the spring 31 and protecting tube 32 are dispensed with and a clip 34 attached to the lower side of the base 12 engages the head 27 which is confined between said clip and a flanged plug 35 fitted in the opening 33 of the base 12. In this manner the dasher is held fast and moves with the carrier when the latter is moved up and down. The clip 34 consists of a strip of metal secured at its ends to the base 12 and curved or bowed downwardly intermediate its ends and formed in an edge with a lateral notch 36 for the ingress and egress of the dasher shaft 28, accordingly, as the same is placed in position or removed.

The article or material to be churned or mixed is placed in a receptacle 23 which may be of any design or material and which is confined between the base 12 upon which it is placed and the cross bar 11 to which is fitted the nut 19 and clamp screw 22; the churning or mixing being effected by moving the carrier up and down which may be effected in any manner by jigging the carrier or placing the hand thereon and imparting a rapid up and down movement thereto.

The article to be beaten, such as the white of an egg, is placed in the receptacle 30 and after adjustment of the dasher and cover 31 the receptacle 30 is placed upon the rest 7 and the dasher adjusted to either of the positions shown in Figures 2 or 3, the dasher being reciprocated by imparting a jigging movement to the carrier in the manner indicated.

Having thus described the invention, I claim:

1. In a device of the character specified, upper and lower sets of springs, couplers connecting corresponding upper and lower springs and a carrier having adjustable connection with the couplers.

2. In a device of the character specified, upper and lower sets of springs, couplers connecting corresponding upper and lower springs and a carrier comprising upper and lower members and connecting members, the latter having adjustable connection with the said couplers.

3. In a device of the character specified, upper and lower sets of springs, couplers connecting corresponding upper and lower springs, members connected with the couplers, a lower member connected with the coupler supported members and an upper member having adjustable connection with the said coupler supported members.

4. A device of the character specified comprising upper and lower sets of springs, couplers connecting corresponding upper and lower springs, upper and lower members and vertical members adjustably connecting said upper and lower members and adjustably supported by the said couplers.

5. In a device of the character specified, a carrier comprising a cross bar having an elongated opening, a nut within the opening and provided with spaced cross heads adapted to be adjusted cross wise of the opening and embrace therebetween portions of the cross bar bordering upon said opening.

6. In a device of the character specified, a carrier comprising a cross bar having an elongated opening, a nut within the opening and provided with spaced cross heads adapted to be adjusted cross wise of the opening and embrace therebetween portions of the cross bar bordering upon said opening, and lugs projecting from parts of the cross bar bordering upon the opening therein to engage opposite sides of a cross head of the nut to limit the turning thereof in one direction.

7. A device of the character specified comprising upper and lower brackets, upper and lower yokes mounted upon the brackets, upper and lower springs having connection with the ends of the respective yokes, couplers connecting corresponding upper and lower springs and a carrier supported by such couplers.

8. A device of the character specified comprising upper and lower brackets, upper and lower yokes mounted upon the brackets, upper and lower springs having connection with the ends of the respective yokes, couplers connecting corresponding upper and lower springs, a carrier supported by such couplers, and a rest mounted upon the lower bracket in line with the carrier.

9. A device of the character specified comprising upper and lower brackets, upper and lower yokes pivotally mounted upon the brackets and having their arms oppositely inclined, upper and lower springs attached to the ends of the respective arms, couplers connecting corresponding upper and lower springs and a carrier comprising upper and lower members and connecting rods, the latter adjustably mounted in the said couplers.

In testimony whereof I affix my signature.

GEORGE P. A. WEISENBORN. [L. S.]